April 13, 1954 A. A. LOMBARD 2,674,843
TEMPERATURE CONTROLLED FUEL SYSTEM OF GAS-TURBINE
ENGINES HAVING REHEAT COMBUSTION EQUIPMENT
Filed Jan. 24, 1949 3 Sheets-Sheet 2
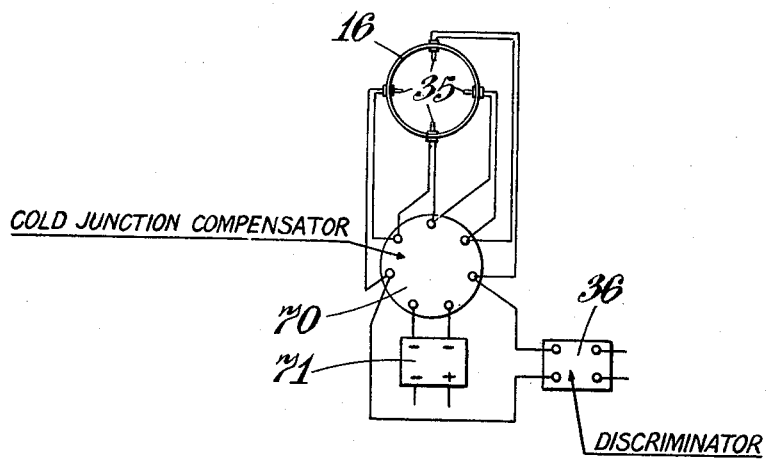
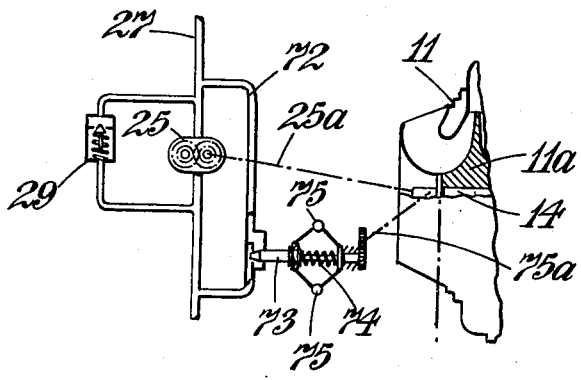
INVENTOR
ADRIAN ALBERT LOMBARD
BY Wilkinson & Mawhinney
ATTYS.

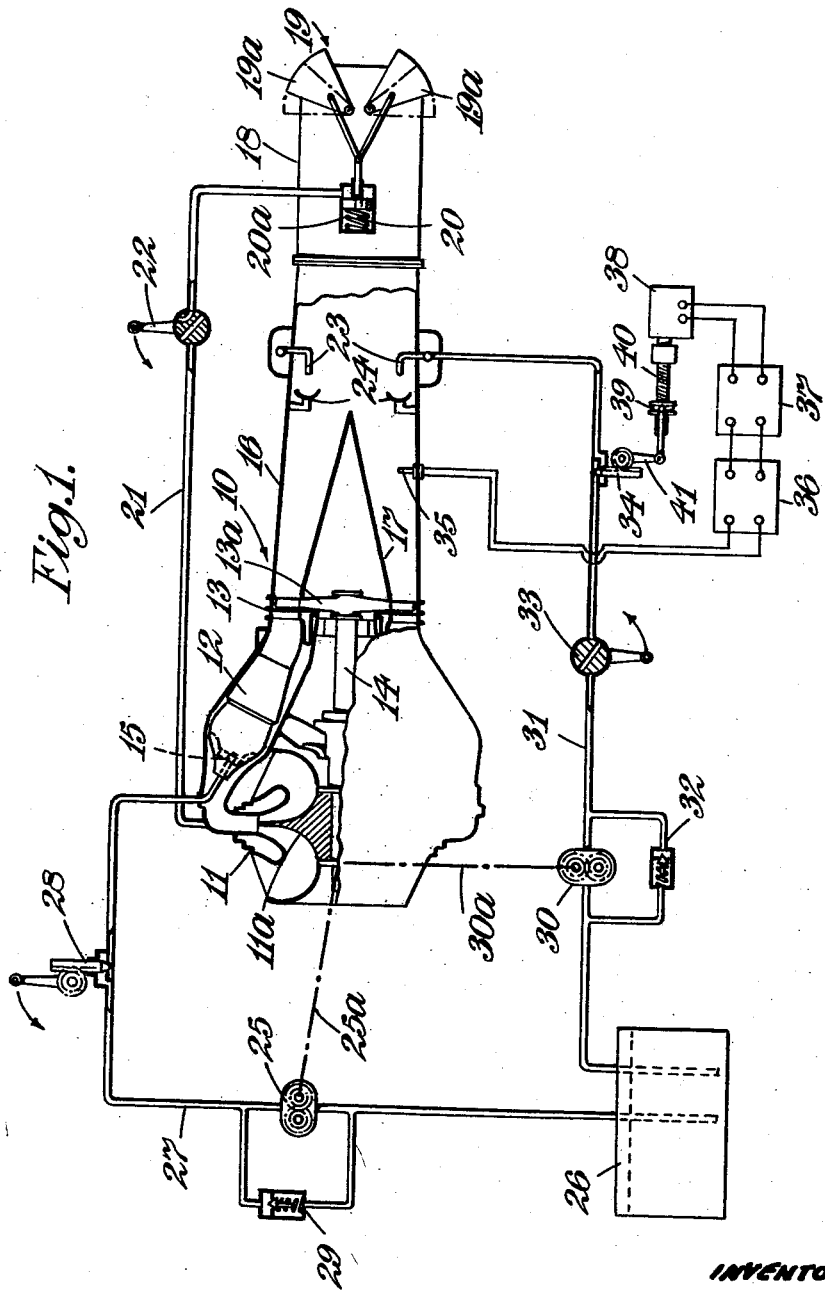

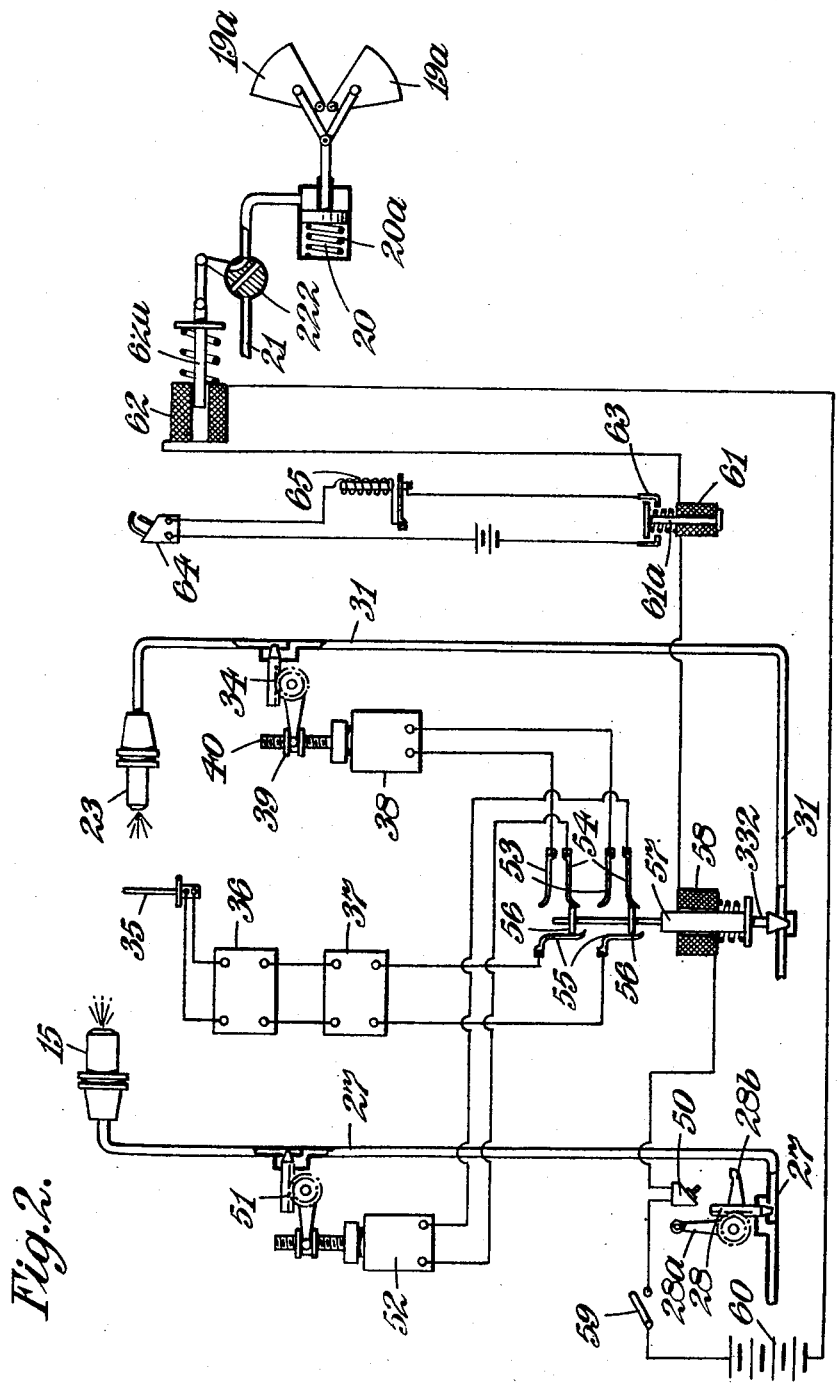

Patented Apr. 13, 1954

2,674,843

UNITED STATES PATENT OFFICE 2,674,843

TEMPERATURE CONTROLLED FUEL SYSTEM OF GAS-TURBINE ENGINES HAVING REHEAT COMBUSTION EQUIPMENT

Adrian Albert Lombard, Allestree, Derby, England, assignor to Rolls-Royce Limited, Derby, England, a British company Application January 24, 1949, Serial No. 72,459

Claims priority, application Great Britain January 28, 1948

8 Claims. (Cl. 60—35.6)

This invention relates to fuel systems for gas-turbine engines of the kind having, in addition to a main combustion stage, one or more additional combustion stages in which gases from the main combustion stage are reheated after passing through a turbine system. Such an additional combustion stage will be referred to hereafter as "a reheat stage."

An important application of the invention is to gas-turbine engines of this kind such as are used for aircraft propulsion purposes by jet-reaction in which the exhaust gases pass through the turbine from the main combustion equipment and are heated in a reheat combustion stage prior to their discharge through a propelling nozzle at high velocity to provide propulsive thrust.

The object of the invention is to facilitate the control of the fuel-supply to a reheat combustion stage in a gas-turbine engine of the kind referred to.

It will be appreciated that particularly where such a reheat stage is used in an aircraft power-plant, it is necessary to vary the fuel supply to the reheat stage with changes of altitude.

According to the present invention there is provided in a gas-turbine engine of the kind referred to means for controlling the fuel supply to a reheat stage comprising temperature-sensitive means located in the gas-flow between the main combustion stage and the reheat stage, and a fuel supply control arranged to be actuated by the temperature-sensitive means to vary the supply of fuel to the reheat stage to maintain the temperature at the location of the temperature sensitive means at or below a predetermined value.

Preferably the temperature-sensitive means is located on the downstream side of a turbine system receiving combustion products from the main combustion equipment of the engine, and upstream of a reheat stage.

Burning of fuel in the reheat stage creates a back-pressure tending to reduce the pressure drop across the turbine fed by the main combustion stage and thus to increase the temperature to which the turbine is subjected. The control arrangement of this invention prevents the operating temperature of this turbine from exceeding a preselected value and therefore avoids overheating of the turbine.

In accordance with a further feature of the invention a gas-turbine engine of the kind referred to for aircraft jet-reaction propulsion purposes, having a reheat stage in which fuel is burnt prior to the passage of the exhaust gases through a propelling nozzle, comprises a temperature-sensitive element located in the gas flow heated by the main combustion equipment and upstream of the reheat stage, said temperature-sensitive means operating through a control system to vary the fuel supply to the reheat stage and thus to maintain a preselected temperature at the location of the temperature-sensitive means.

The temperative sensitive means may comprise a thermocouple, resistance thermometer or thermally expansible element. When a thermocouple is employed the output voltage may be matched against a selected datum voltage and the resultant overall voltage output amplified to control a fuel valve or throttle; when a resistance thermometer is employed, the resistance element may form part of a bridge circuit, the output of which is applied to a suitable amplifier. Alternatively, a thermally expansible element may be arranged to operate a fuel control valve or its equivalent either directly or indirectly through a servo power system. A plurality of temperature sensitive elements may be employed and arranged to sense a mean temperature, in accordance with which mean temperature the fuel supply control is effected.

According to a further feature of the invention, in a gas-turbine engine of the kind referred to having a reheat stage which is used intermittently, the temperature-sensitive means is arranged, when the reheat stage is inoperative, to control the fuel supply to the main combustion equipment so as to maintain the temperature to which it is subjected at or below a pre-selected value and, when the reheat stage is operative, to control the fuel supply to the reheat stage as above set forth.

Two arrangements according to this invention will now be described with reference to the accompanying drawings in which:

Figure 1 illustrates diagrammatically a gas-turbine engine with a control according to the invention applied thereto, Figure 1A is a view illustrating a modification which may be applied to the arrangement of Figure 1, Figure 2 illustrates an alternative control arrangement, and Figure 3 illustrates an additional control which may be employed with the arrangement of Figures 1 and 2.

The same reference numerals are employed in all figures of the drawings to indicate like parts.

Referring to Figure 1, there is illustrated an aircraft jet-reaction propulsion gas-turbine engine 10 and the controls therefor.

The gas-turbine engine comprises a compressor 11, illustrated as a centrifugal compressor of the double entry type, which is arranged to deliver compressed air into a series of combustion chambers 12 of any known or convenient form. The combustion chambers 12 extend towards an axial flow turbine 13 the rotor 13a of which is drivingly connected to the impeller 11a of the compressor by a shaft 14. The combustion chambers 12 are disposed in a ring around the shaft 14.

Fuel is delivered into the combustion chamber 12 through injection devices 15 and the hot combustion gases flow out from the combustion chambers through the turbine 13, to drive it, and thence into an exhaust unit comprising an outer wall 16 and an inner conical wall 17. A jet pipe 18 is secured to the outlet end of the exhaust unit and an adjustable-area propelling nozzle 19 is carried at the end of the jet-pipe.

The nozzle 19 comprises in a known manner a pair of pivoted flaps 19a the positions of which are adjustable by a mechanism 20 illustrated as a pneumatically-operated motor-device. It may however be a hydraulically-operated or an electrically-operated motor-device.

The pressure air for operating the mechanism 20 is derived from the outlet of the compressor 11 and conveyed to the mechanism 20 by a conduit 21 containing a manually operable control valve 22 which can be set in two positions in one of which positions (that illustrated) the cylinder of the motor is connected to atmosphere and in the other of which the cylinder is connected to the pressure air supply.

The outer wall 16 of the exhaust unit 10 extends beyond the end of the conical wall 17 and this portion of the exhaust unit is employed, when necessary, as a reheat combustion chamber for heating the exhaust gases leaving the turbine 13 prior to their discharge through the nozzle 19. Fuel is delivered into the exhaust gas stream through injection devices 23 of any known or convenient form. In the drawing the injection devices are illustrated as injecting the fuel upstream each towards an associated baffle 24. The baffles 24 are each in the form of a dished disc and form stagnant regions in which the combustion of the fuel occurs.

If desired, the cross-section of the exhaust duct may be increased in the region of reheat combustion to reduce the exhaust gas velocity in this region and may be reduced again beyond this region.

When the reheat combustion means is operative, the nozzle 19 will be set with the flaps 19a retracted (dotted line position) and when the reheat combustion means is inoperative the flaps 19a will occupy the full line position under the influence of the spring 20a.

The fuel supply system for the injection devices 15 of the main combustion equipment 12 comprises a pump 25 driven from the shaft 14 through a suitable drive indicated by dotted line 25a. The pump draws fuel from a fuel tank 26 and delivers it through pipe line 27 past a manually-operated throttle valve 28 to the injection devices 15. A relief valve controlled by-pass 29 is provided around the pump 25 to maintain a selected pressure in the delivery pipe 27 upstream of the throttle 28.

The fuel supply system for the injection devices 23 comprises a pump 30 driven from the shaft 14 through a drive indicated by dotted line 30a. The pump draws fuel from the tank 26 and delivers it through a pipe-line 31 to the injection devices 23. A relief-valve controlled by-pass 32 is provided around the pump 30 to maintain a constant delivery pressure from the pump. The fuel system can incorporate any known means for compensating for changes in altitude.

The flow through pipe-line 31 is controlled by a shut-off cock 33 which can be moved between a fully-closed position and a fully-open position and by a throttle 34 controlled in a manner hereinafter to be described to maintain the temperature in the exhaust unit 16 at a location upstream of the reheat region at or below a preselected temperature.

It will be appreciated that when the reheat stage is operative the pressure drop across the turbine 13 is reduced so that the operating temperature tends to rise. The throttle 34 is controlled so that an excessive operating temperature is not experienced in the turbine.

The throttle 34 is controlled in the following manner:

A temperature sensitive device, for example, a thermocouple 35, is located in the exhaust unit at a point intermediate the turbine outlet and the baffles 24 of the reheat stage, and the temperature sensitive device is arranged through a control mechanism to operate the throttle if the temperature at its location rises above or falls below a selected value. Thus the fuel supply to the injection devices 23 is either cut down or increased to maintain a preselected temperature. For this purpose, for example, the thermocouple is connected to a standard electrical E. M. F. source through a suitable resistance circuit, the output from which is fed to a discriminator device 36 of known or convenient form, which senses the thermocouple voltage as balancing, being less than or being excess of the standard voltage. The output from the device 36 is fed to an amplifier 37 and applied to a reversible motor 38 to cause the motor to rotate in one direction when the out of balance of the thermocouple voltage is in one direction and to rotate in the opposite direction when the out of balance of the thermocouple voltage is in the opposite direction.

The motor on rotation causes a nut member 39 to travel along a threaded spindle 40 thereby to rock the control arm 41 of the throttle 34.

In practice it is preferred (as shown in Figure 1A) to provide a plurality of temperature sensitive devices, such as 35, and to arrange them in a ring around the exhaust unit 16 to give a mean temperature reading which is employed to control the throttle 34. With such an arrangement cold junctions of the thermocouples 35 may be connected in known manner to a cold junction compensating unit 70 having associated with it a voltage compensating unit 71. The output terminals of the cold junction compensating unit 70 will be connected to the device 36.

The device 36 may take any known or convenient form. For instance, when the device 35 is a resistance thermometer, it may be included in one arm of a resistance bridge which arm also includes a variable resistance by which the datum temperature can be selected. With an A. C. supply to the bridge, the phase of the output will vary through 180° according to whether the bridge is out of balance in one direction or the other. This change of phase can readily be employed to control the direction of rotation of the motor 38.

Alternatively, the control may be operative only to reduce the fuel supply through injection devices 23 when the temperature exceeds a selected value. In this case the device 35 can be a thermocouple or a series of thermocouples, the output voltage thereof being matched against a standard selected voltage. When the thermocouple voltage exceeds the standard voltage the excess voltage is amplified through a thermionic tube amplifier and the output from the latter employed to operate a fuel-control throttle or by-pass, which reduces fuel supply to the reheat combustion equipment. The temperature at which the temperature sensitive control operates is selected according to the maximum temperature to which the turbine can be safely subjected whilst running at maximum speed; such a maximum temperature control is desirable in an aircraft gas-turbine engine.

With a gas-turbine engine, such as is illustrated in Figure 1, for aircraft propulsion, it is desirable that the temperature of the hot gases flowing through the engine from the main combustion equipment should not exceed a selected value even when the reheat stage is inoperative. This effect is achieved in the control arrangement of Figure 2 by arranging that, when the reheat stage is inoperative, the temperature sensitive device 35 controls the flow of fuel to the main fuel injection devices 15. It is also desirable to reduce the number of controls required to be handled by the pilot or flight engineer of an aircraft and in the control arrangement as illustrated in Figure 2, the number of manual controls is reduced to a minimum by coupling varous control devices electrically to operate in a desired manner. Referring to Figure 2, the operating arm 28a of the manual throttle 28 controlling the fuel flow to injection devices 15 is formed with a radius arm 28b which when the throttle is moved to the full throttle position closes a switch 50. The fuel flow to the injection devices is also controlled by a motorised throttle 51 the movements of which are effected by a reversible motor 52 under control of the temperature sensitive device 35 when the reheat stage is inoperative.

The input leads of the reversible motors 38, 52 are connected respectively to pairs of spaced spring contacts 53, 54, of a switch mechanism which also comprises a pair of bus bars 55 connected to the output terminals of the amplifier 37 and a pair of insulated moving contacts 56 carried on the armature 57 of a solenoid device 58. When the solenoid is energised the contacts 56 connect the contacts 53 to the bus bars 55 and when the solenoid is de-energised the contacts connect the contacts 54 to the bus bars 55. Thus, when the solenoid is energised the device 35 is operative to control the throttle 34 and when the solenoid is de-energised the device 35 is operative to control the throttle 51. The armature 57 also operates a shut-off cock 332 in the pipe-line 31 so that when the solenoid 58 is energised the shut-off cock 332 is fully open.

The coil of the solenoid 58 is in series with switch 50, a second and manually-operated switch 59, a source of current illustrated as a battery 60 and two further solenoids 61 and 62. Thus, when the switches 59 and 50 are closed, the latter being closed when the throttle 28 is moved to "full throttle," the solenoids 58, 61, 62 are all energised.

The armature 61a of the solenoid device 61 operates a switch 63, when the solenoid is energised, to complete a circuit through the reheat stage fuel ignition means which comprises a spark plug device 64 and a sparkling coil indicated at 65. Thus, when fuel is being supplied to the reheat stage injection devices 23, the ignition means are operative.

The armature 62a of the solenoid device 62 is arranged to operate a valve 222 in the conduit 21 to the pneumatic motor 20 so that the valve 222 is open when the solenoid is energised and closed when the solenoid is de-energised. Thus, when the device 35 is operative to control the fuel supply to the injection devices 23 of the reheat stage, the valve 222 will be open and the flaps 19a of the variable area nozzle 19 will occupy the dotted position of Figure 1. When the solenoid 62 is de-energised, the flaps 19a will occupy the full-line position of Figure 1 under the influence of the spring 20a.

It will be understood that the shut-off cock 332 and valve 222 correspond respectively to the shut-off cock 33 and valve 22 of Figure 1.

It will be seen that when the reheat stage is inoperative the switch 59 will be open and operation of the gas-turbine engine will be controlled by the manual throttle 28, the throttle 51 being automatically controlled by the device 35 to maintain a selected temperature of the gas-flow through the turbine or to prevent the temperature from exceeding a selected value.

To render the reheat stage operative the switch 59 is closed and the throttle 28 is moved to the full throttle position to close switch 50 whereby:

(1) Solenoid 58 is energised opening shut-off cock 332 and transferring the temperature control by device 35 from the throttle 51 to the throttle 34.

(2) Solenoid 61 is energised rendering operative the ignition means 64, 65 of the reheat stage, and (3) Solenoid 62 is energised opening valve 222 to permit pressure air to enter the cylinder of the pneumatic-motor 20 and thereby to retract the flaps 19a to increase the effiective area of the nozzle 19.

It will be understood that the reheat stage is normally used only when it is desired that the engine shall develop a power in excess of that developed at its normal full rotational speed and if desired therefore an overspeed governor may be provided to control the main fuel supply to prevent over-speeding of the engine rotor. One such overspeed control is illustrated in Figure 3 and comprises, as will be well understood, a by-pass pipe 72 connecting the delivery side of pump 25 to the inlet side of the pump and a valve 73 in the pipe 72 operated by a speed-sensitive device which is shown for convenience as comprising fly bobs 75 rotated at a speed proportional to the engine speed through a drive connection 75a and arranged to displace the valve member 73 against the action of a spring 74. When the load due to the fly bobs 75 is sufficient to overcome the spring 74 the valve 73 is opened to permit a bleed from the delivery side of pump 25 so reducing the fuel supply to the main injectors 15.

I claim:

1. In a gas-turbine engine having a compressor, main combustion equipment connected to receive air compressed by said compressor, first fuel supply means to supply fuel to said main combustion equipment and including first fuel supply control means to control said supply, a turbine connected to receive heated gases from said main combustion equipment, and reheat combustion equipment connected to receive gases exhausted from said turbine, said reheat combustion equipment being in uninterrupted communication with the outlet of said turbine, second fuel supply means to supply full to said reheat combustion equipment, means for controlling the second fuel supply means independently of said first control means comprising temperature-sensitive means located in the gas flow between the main combustion equipment and the reheat combustion equipment and a fuel supply control adapted to be actuated by the temperature-sensitive means to vary the supply of fuel to the reheat combustion equipment in the sense of decreasing the supply of fuel on increase of the temperature sensed by said temperature-sensitive means thereby to maintain the temperature to which the temperature-sensitive means is subjected at or below a predetermined value.

2. A gas-turbine engine comprising an air compressor, a main combustion chamber connected to receive air from said compressor, a turbine connected to receive hot gases from said combustion chamber and adapted to be driven by said hot gases, a main drive shaft connecting the compressor and the turbine, a reheat combustion chamber, duct means connected at one end to the outlet of said turbine and at the other end to said reheat combustion chamber thereby to cause hot gases exhausted from said turbine to pass to said reheat combustion chamber, a main fuel injector in said main combustion chamber, first fuel supply means including first control means to deliver fuel to said main fuel injector, a reheat fuel injector in said reheat combustion chamber, fuel supply means connected to supply fuel to said reheat fuel injector, second control means independent of said first control means and adapted to control the supply of fuel to said reheat fuel injector, thermocouple means including temperature-sensitive means located in said duct to be responsive to the temperature of the gases exhausting from said turbine, said thermocouple means being connected to said reheat fuel supply control means to vary the supply of fuel to the reheat combustion equipment in the sense of decreasing the supply of fuel on increase of the temperature sensed by said temperature-sensitive means.

3. In an aircraft jet-reaction propulsion unit comprising a main combustion stage, first supply means to supply fuel to said main combustion stage, first control means to control the supply of fuel through said first fuel supply means, a gas-turbine fed with hot gas from said combustion stage, an exhaust unit from said gas-turbine comprising a jet-pipe and propelling nozzle, and second fuel supply means to supply fuel to said jet pipe to provide a reheat stage; reheat control means operable independently of said first control means and adapted to control the fuel supply to the reheat stage through said second fuel supply means comprising temperature sensitive means a portion of which is located in the gas flow heated in the main combustion stage and upstream of the reheat stage and responsive to temperature of said gas when said temperature is at or above a selected value, and a control device actuated by the temperature sensitive means and operative to vary the fuel supply to the jet-pipe in the sense of decreasing the fuel supply on increase of the temperature sensed by said temperature-sensitive means thereby to maintain the temperature at the location of said portion of the temperature sensitive means at or below a preselected value.

4. A gas-turbine engine comprising a main combustion stage, at least one reheat combustion stage arranged to reheat gases flowing from the main combustion stage, temperature-sensitive means located in said gases flowing between said main and reheat combustion stages to be sensitive to the temperature of said gases, first fuel supply means to deliver fuel to said main combustion stage, first control means arranged to control the delivery of said fuel to said main combustion stage, second fuel supply means to deliver fuel to said reheat combustion stage, second control means arranged to control the delivery of said fuel to said reheat combustion stage, selecting means arranged on actuation selectively to render the reheat stage operative and inoperative, and means arranged to be actuated on actuation of said selecting means to render said reheat stage operative to connect said temperature-sensitive means to said second control means and to disconnect said temperature-sensitive means from said first control means, and to be actuated on operation of said selecting means to render said reheat stage inoperative to disconnect said temperature-sensitive means from said second control means and to connect said temperature-sensitive means to said first control means, each of said control means when connected to said temperature-sensitive means being arranged to vary the corresponding fuel supply in the sense of decreasing the fuel supply on increase of the temperature sensed by said temperature-sensitive means.

5. In a gas-turbine engine having a main combustion stage and at least one reheat combustion stage arranged to reheat gases flowing from the main combustion stage, the combination with temperature-sensitive means located in said gases flowing between said main and reheat combustion stages to be sensitive to the temperature of said gases, of first fuel-supply means arranged to deliver fuel to said main combustion stage, second fuel supply means arranged to deliver fuel to said reheat combustion stage, and control means including selector means arranged to connect said temperature-sensitive means selectively to said first and second fuel supply means, said control means being arranged to be actuated by the temperature-sensitive means to control the selectively connected fuel supply means to maintain the said temperature to which the temperature-sensitive means is sensitive, at or below a preselected value, said first fuel supply means including a manually-operated throttle and a motorised throttle arranged to be operated by said control means, said second fuel supply means including a shut-off cock and a motorised throttle arranged to be operated by said control means, said selector means arranged to be operated by said manually-operated throttle to connect said temperature-sensitive means selectively to said motorised throttles through the control means, said motorised throttle of said second fuel supply means being controlled when the reheat combustion stage is operative, and said shut-off cock being connected with said manually-operated throttle to be opened when said selector means is operated to connect said temperature-sensitive means to said motorised throttle of said second fuel supply means.

6. In a gas-turbine engine having a main combustion stage and at least one reheat combustion stage arranged to reheat gases flowing from the main combustion stage, the combination with temperature-sensitive means arranged at a location in the gas flow between said main and reheat combustion stages to be sensitive to the temperature of the gases at said location; of first fuel supply means for said main combustion equipment comprising a manually-operated throttle and a power-operated throttle, second fuel supply means for said reheat combustion equipment comprising a shut-off cock and a power-operated throttle, control means, selector means arranged for operation by said manually-operated throttle and arranged to connect said temperature-sensitive means through said control means selectively to said power-operated throttles, said control means being actuated by said temperature-sensitive means to adjust the selectively-connected power-operated throttle to maintain said temperature at or below a preselected value, said selector means also being arranged to open said shut-off cock when the power-operated throttle of said second fuel supply means is connected to the temperature-sensitive means and to close the shut-off cock when the power-operated throttle of said first fuel supply means is connected to the temperature-sensitive means; and of a variable-area propelling nozzle for said engine, motor means to adjust the area of said nozzle, said motor means being arranged to be controlled by said selector means to increase said area when said shut-off cock is opened and to decrease said area when the shut-off cock is closed.

7. In a gas-turbine engine, the combination as claimed in claim 6 comprising also ignition means arranged to initiate combustion of fuel in the reheat combustion stage and connected to said selector means to be actuated on opening of said shut-off cock.

8. In a gas-turbine engine having a main combustion stage and at least one reheat combustion stage arranged to reheat gases flowing from the main combustion stage, the combination with temperature-sensitive means for preventing the operating temperature of the engine from exceeding a preselected value located in said gases flowing between said main and reheat combustion stages to be sensitive to the temperature of said gases, of first fuel supply means arranged to deliver fuel to said main combustion stage and including a throttle, second fuel-supply means arranged to deliver fuel to said reheat combustion stage, and control means including selector means arranged to connect said temperature-sensitive means to said first fuel-supply means until the first fuel-supply means has reached its maximum operating condition and an element responsive to the movement of said throttle to its fully open position to initiate movement of the selector means for connecting said temperature-sensitive means to said second fuel-supply means when said first fuel-supply means has reached its maximum operating condition, said control means being arranged to be connected by the temperature-sensitive means to control the selectively connected fuel-supply means to maintain the said temperature to which the temperature-sensitive means is sensitive at or below a preselected value.

References Cited in the file of this patent

UNITED STATES PATENTS

| Number | Name | Date |
|---|---|---|
| Re. 22,201 | Lysholm | Oct. 13, 1942 |
| 2,040,328 | Olson | May 12, 1936 |
| 2,078,957 | Lysholm | May 4, 1937 |
| 2,095,991 | Lysholm | Oct. 19, 1937 |
| 2,115,112 | Lysholm | Apr. 26, 1938 |
| 2,247,858 | Selby | July 1, 1941 |
| 2,409,176 | Allen | Oct. 15, 1946 |
| 2,457,595 | Orr | Dec. 28, 1948 |
| 2,479,777 | Price | Aug. 23, 1949 |
| 2,498,939 | Bobier | Feb. 28, 1950 |
| 2,506,611 | Neal | May 9, 1950 |
| 2,520,967 | Schmitt | Sept. 5, 1950 |
| 2,546,415 | Alcock | Mar. 27, 1951 |
| 2,566,373 | Redding | Sept. 4, 1951 |